(12) United States Patent
Krueger et al.

(10) Patent No.: US 9,097,899 B2
(45) Date of Patent: Aug. 4, 2015

(54) ACHROMATIC SCANNER HAVING A MONOCHROMATIC F-THETA OBJECTIVE

(71) Applicant: JENOPTIK Optical Systems GmbH, Jena (DE)

(72) Inventors: Ullrich Krueger, Milda (DE); Thomas Dressler, Jena (DE); Stefan Heinemann, Jena (DE)

(73) Assignee: JENOPTIK Optical Systems GmbH, Jena (DE)

( * ) Notice: Subject to any disclaimer, the term of this patent is extended or adjusted under 35 U.S.C. 154(b) by 0 days.

(21) Appl. No.: 14/418,805

(22) PCT Filed: Jul. 24, 2013

(86) PCT No.: PCT/DE2013/100275
§ 371 (c)(1),
(2) Date: Jan. 30, 2015

(87) PCT Pub. No.: WO2014/019572
PCT Pub. Date: Feb. 6, 2014

(65) Prior Publication Data
US 2015/0153567 A1   Jun. 4, 2015

(30) Foreign Application Priority Data

Aug. 1, 2012  (DE) .................... 10 2012 107 040

(51) Int. Cl.
*G02B 26/12*     (2006.01)
*G02B 27/00*     (2006.01)

(52) U.S. Cl.
CPC ............ *G02B 26/124* (2013.01); *G02B 27/005* (2013.01); *G02B 27/0031* (2013.01)

(58) Field of Classification Search
CPC ...... G02B 26/124; G02B 26/12; G02B 26/08; G02B 27/00
See application file for complete search history.

(56) References Cited

U.S. PATENT DOCUMENTS

| 4,792,695 | A | 12/1988 | Blandford |
| 5,262,887 | A | 11/1993 | Feinberg |
| 5,363,126 | A | 11/1994 | Andrews |
| 6,278,109 | B1 | 8/2001 | Andrews |
| 6,473,233 | B1 | 10/2002 | Iizuka |
| 6,515,782 | B1 * | 2/2003 | Harrigan et al. ........... 359/206.1 |
| 2005/0185238 | A1 * | 8/2005 | Kimura ........................ 359/215 |

FOREIGN PATENT DOCUMENTS

| DE | 603 02 183 T2 | 8/2006 |
| EP | 0 211 803 A1 | 2/1987 |
| EP | 0 589 700 A1 | 3/1994 |
| EP | 1 376 196 B1 | 11/2005 |

* cited by examiner

*Primary Examiner* — Sarah Al Hashimi
(74) *Attorney, Agent, or Firm* — Duane Morris LLP

(57) ABSTRACT

An achromatic scanner in which pre-scan optics and post-scan optics are designed and disposed with respect to one another in such a way that for a light beam imaged onto the target surface a first image plane of the pre-scan optics coincides with a first object plane of the post-scan optics for a first beam portion and a second image plane of the pre-scan optics coincides with a second object plane of the post-scan optics for a second beam portion, wherein an image plane of the post-scan optics which lies on the target surface is associated with the first object plane of the post-scan optics and the second object plane of the post-scan optics.

6 Claims, 5 Drawing Sheets

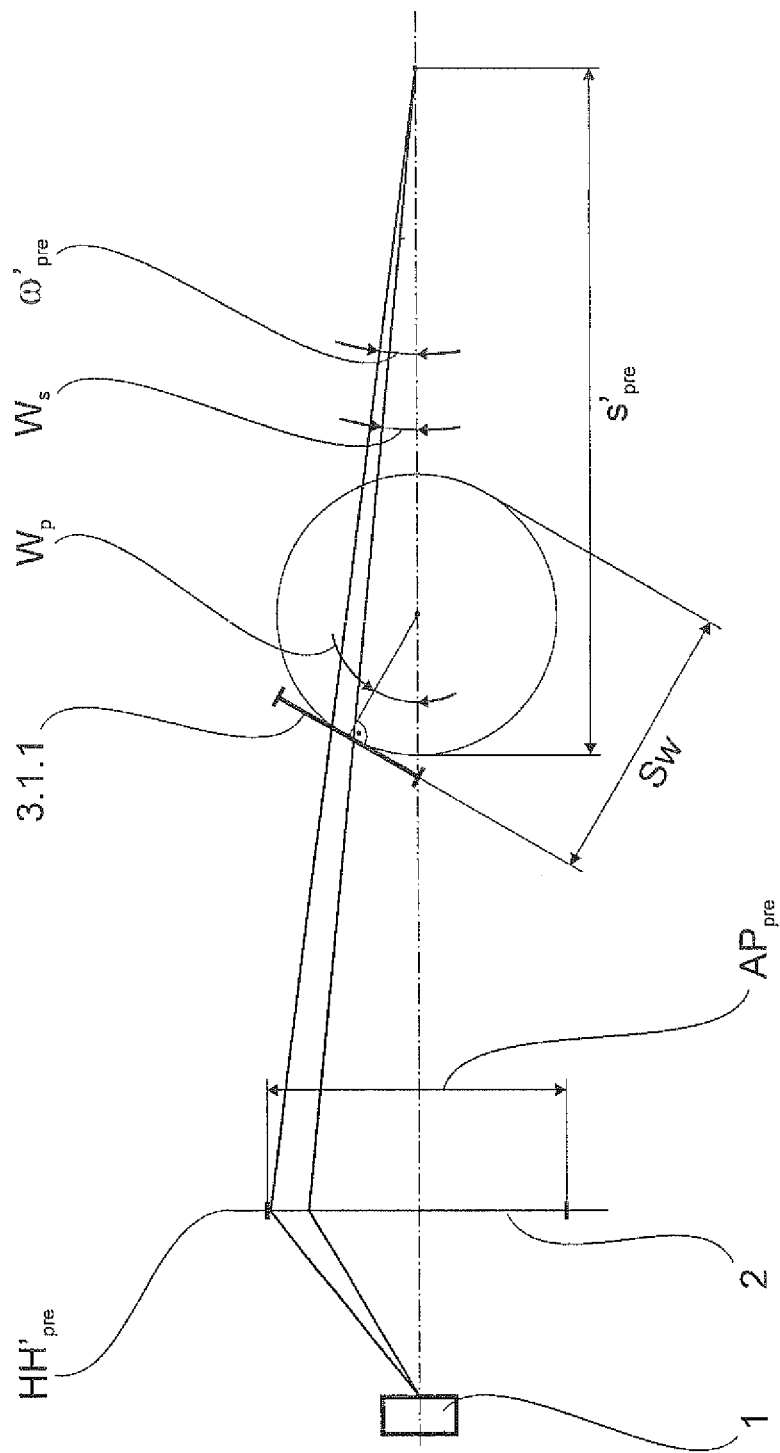

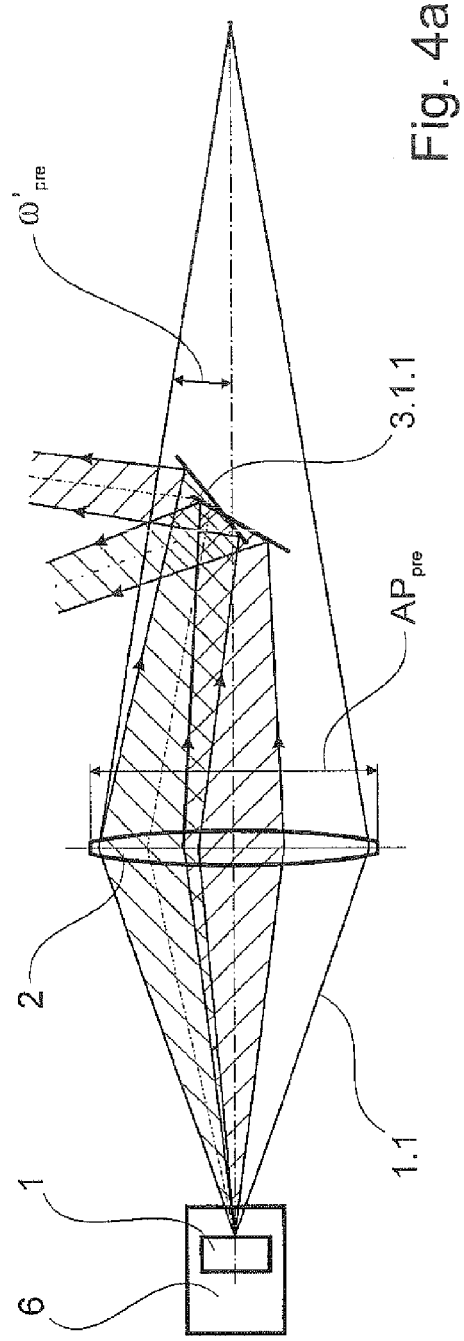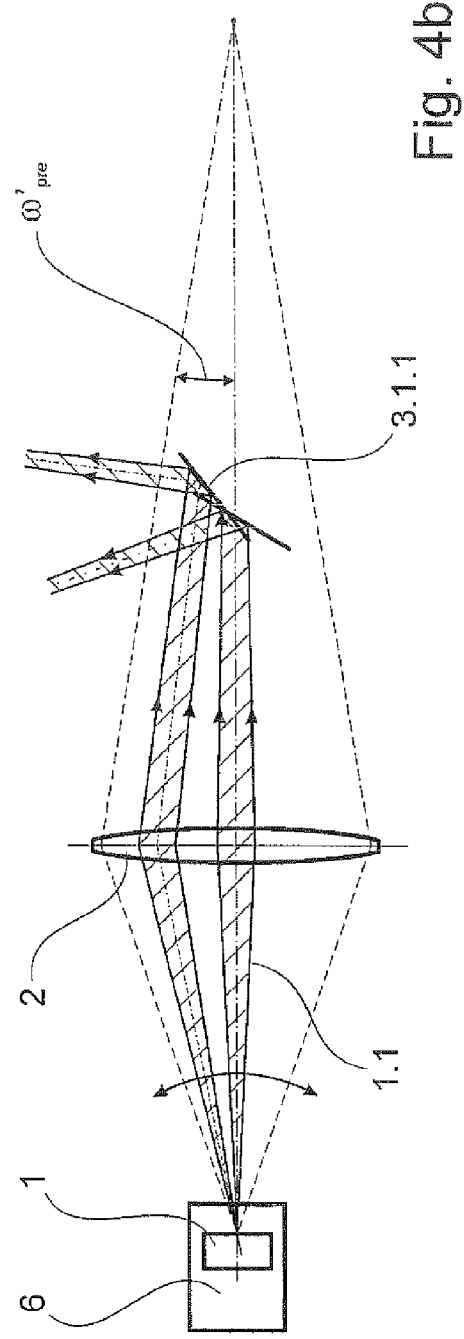

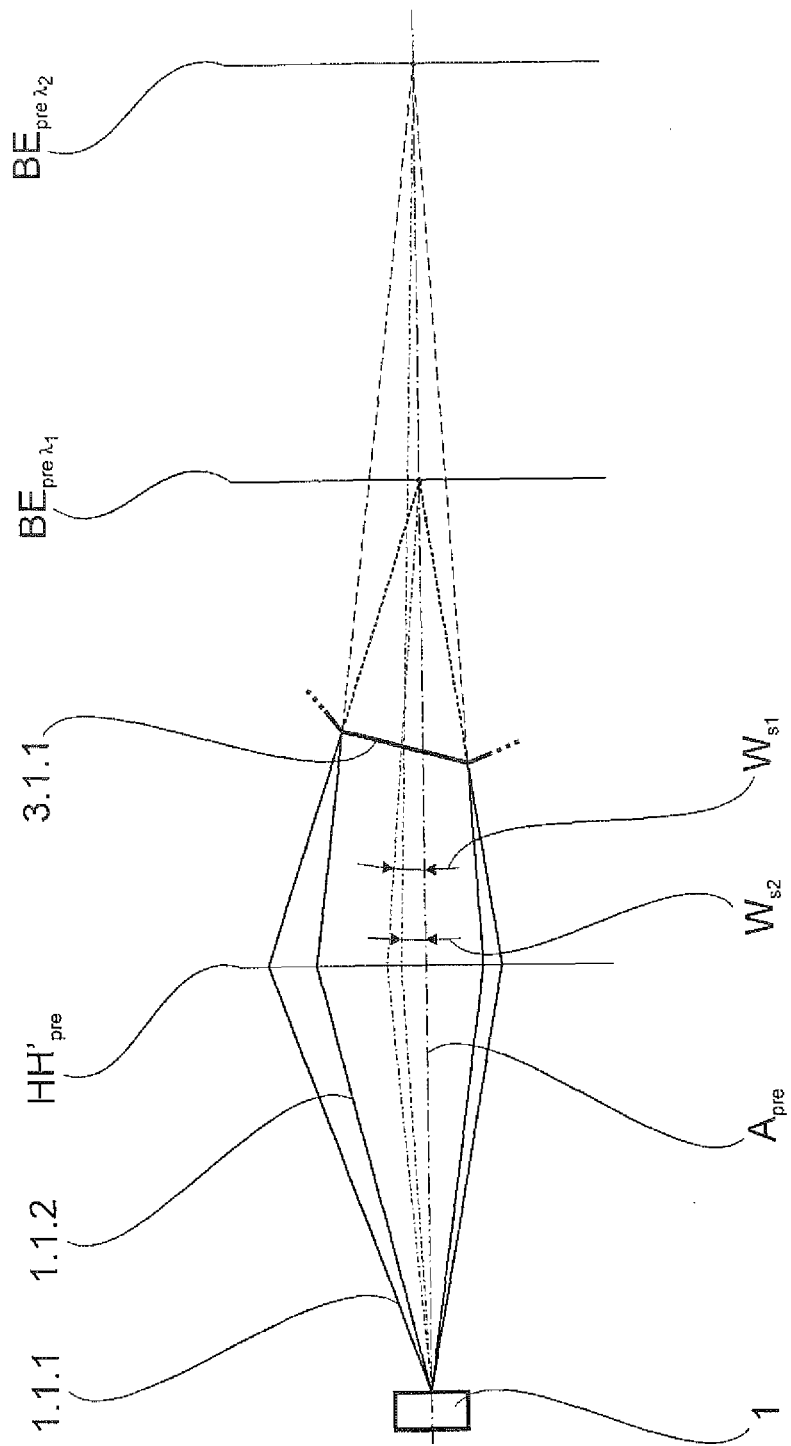

ured image quality. In a typical
ACHROMATIC SCANNER HAVING A MONOCHROMATIC F-THETA OBJECTIVE

RELATED APPLICATIONS

The present application is a U.S. National Stage application of International PCT Application No. PCT/DE2013/100275 filed on Jul. 24, 2013 which claims priority benefit of German Application No. DE 10 2012 107 040.7 filed on Aug. 1, 2012, the contents of each are incorporated by reference in their entirety.

FIELD OF THE INVENTION

The invention relates to an achromatic scanning device, which is known, generically, from the patent DE 603 02 183 T2.

This aforementioned patent specification DE 603 02 183 T2 discloses an achromatic scanning device (here an optical scanner) with a chromatically corrected f-theta lens (also f-θ lens).

BACKGROUND OF THE INVENTION

A scanning device, which can be used according to the aforementioned DE 603 02 183 T2, for example, in a laser printer or, according to the present invention, for example, for the direct exposure of printed circuit boards, scans a flat target surface with a light beam along a scan line in a scan direction, while the target surface is moved to the scanning device or said scanning device is moved to the target surface in a feed direction that runs perpendicular to the scanning device.

The light beam scans in a scan direction by means of a scanning unit, for example, with a galvanometer mirror or a polygon mirror, which rotates at a uniform angular velocity. In order for the light beam to scan the target surface at a uniform velocity, a so-called f-theta lens is used, according to the aforementioned DE 603 02 183 T2, as an optical system that is downstream of the scanning unit (post-scanning optical system). Such an f-theta lens has a distortion characteristic, which in the ideal case satisfies $y=f*\theta$ (f=focal length, θ=coupling-in angle=angle that the axial ray of a light beam entering the f-theta lens encloses with the optical axis of the f-theta lens; y=image height).

Generically, a scanning device includes a light source; an optical system (pre-scanning optical system), which is upstream of the aforementioned scanning unit, for shaping and guiding a light beam, coming from the light source, onto the scanning unit; and an optical system (post-scanning optical system), which is downstream of the scanning unit, for shaping and guiding the light beam, deflected by the scanning unit, onto a target surface.

An ideal imaging of the light beam at the image height Y in the plane of the target surface, i.e. in the scan direction at a distance y from the optical axis of the f-theta lens (hereinafter the ideal image position) is performed, provided that the optical system, formed by the scanning device, is monochromatic, only for a light beam with one wavelength. This means that for light beams having a wavelength spectrum that has not only a single wavelength within a negligible bandwidth, wavelength-dependent images are produced in multiple image positions or, in the event of a wide bandwidth, an image, which is expanded in the depth and in the cross section, is produced around the ideal image position. In a typical example for a monochromatic system, all of the refractive elements can be made of the same material.

This may apply, for example, when the wavelength of a light beam changes at the working temperature. That is, its working wavelength is in a wavelength range between two wavelengths, for example, as stated in the aforementioned DE 603 02 183 T2, between 400 nm and 410 nm.

This can also apply, for example, when the light beam has beam components of two different wavelengths, such as, for example, 375 nm and 405 nm; or the light source emits a light beam having a broadband between two wavelengths.

In order to be able to obtain a high resolution image of such light beams having beam components of two wavelengths in an ideal image position and, as a result, the image quality is improved on the whole, the optical system has to be achromatic. That is, it is calculated in such a way that it is corrected for these two wavelengths.

SUMMARY OF THE INVENTION

According to the invention, all light beams, for which an improvement of the image quality can be achieved by correcting the optical system for two wavelengths, may be construed as a light beam having two beam components of different wavelengths, for which the scanning device is corrected for chromatic aberrations.

All optical materials have a material specific, wavelength-dependent refractive index (dispersion), for which reason beam components of different wavelengths are refracted to different degrees and are imaged with longitudinal deviations (longitudinal chromatic aberration) in the direction of the optical axis and transverse deviations (transverse chromatic aberration=chromatic aberration of magnification) in the scan direction, perpendicular to the optical axis.

In a scanning device according to the aforementioned DE 603 02 183 T2, the pre-scanning optical system is formed, apart from a flat mirror that is used strictly to deflect the beam, by a collimator and a cylindrical lens. Owing to the achromatic design of the f-theta lens, it is obvious that the pre-scanning optical system is also achromatic; and, thus, an achromatic collimated light beam, deflected by the polygon mirror, impinges on the f-theta lens.

The f-theta lens is a part of the post-scanning optical system (here the optical imaging system) and is specifically designed. It consists of lenses or groups of lens with a certain refractive power sequence and fulfills certain geometrical conditions, in order to achieve a good achromatism.

The materials that can be used here are, for example, hyaline or optical plastics.

The described scanning device is suitable only for low powers of less than 1 W. For powers greater than 5 W in the UV range, with the demand for a long life, the choice of materials that may be used to build an achromatic f-theta lens is very limited. For this purpose only synthetic quartz glass or calcium fluoride is suitable. The latter is very expensive to produce and to process.

The US 2005/185238 A1 discloses a scanning device, which in accordance with the present invention has a pre-scanning optical system, a polygon mirror and a post-scanning optical system. The pre-scanning optical system consists of a first optical system and a second optical system, wherein the second optical system has an aspherical optical surface, which compensates for the spherical aberrations, caused by the first optical system. It is advantageous that this aspherical area exhibits a diffractive area, which also corrects the chromatic aberration of the whole optical system. It is completely unclear whether and, if so, how, such an arrangement compensates not only for a longitudinal chromatic aberration, but also for a transverse chromatic aberration, especially since the pre-scanning optical system shapes the light beam into a light beam that is at least almost collimated.

The EP 0 211 803 A1 discloses a scanning device with an f-theta lens, which is provided for a monochromatic use, i.e. use with laser radiation of only one wavelength. Consequently the optical system of this scanning device is not chromatically corrected; and no measures for a chromatic correction are implemented.

The object of the present invention is to find an inexpensive achromatic scanning device that is suitable for a high energy input, greater than 5 W, by means of light beams having beam components of two wavelengths in the UV range.

This engineering object is fulfilled for an achromatic scanning device with a light source; a scanning unit formed with a rotatable polygon mirror, having a polygon angle; a pre-scanning optical system upstream of the polygon mirror, and a post-scanning optical system; which is located downstream of the polygon mirror, and which is formed by an f-theta lens. The light source is designed to emit a light beam with a first beam component having a first wavelength and a second beam component having a second wavelength. The f-theta lens shapes and guides the light beam, which is deflected by the polygon mirror into a scan direction, onto a target surface, which is arranged in an image plane of the post-scanning optical system for the two beam components.

An essential feature of the invention is that the post-scanning optical system is monochromatic. Hence, all of its refractive elements can be made of an identical material, a feature that causes wavelength-dependent chromatic aberrations. Therefore, the post-scanning optical system can be manufactured comparatively cheaper than an achromatic post-scanning optical system. The pre-scanning optical system and the post-scanning optical system are designed and arranged with respect to each other in such a way that for a light beam, which is imaged onto the target surface, a first image plane of the pre-scanning optical system in a first intersection length on the image side coincides with a first object plane of the post-scanning optical system for the first beam component; and a second image plane of the pre-scanning optical system in a second intersection length on the image side coincides with a second object plane of the post-scanning optical system for the second beam component. In this case the first object plane of the post-scanning optical system and the second object plane of the post-scanning optical system are assigned the image plane of the post-scanning optical system, so that the longitudinal chromatic aberration is corrected for the two beam components.

The post-scanning optical system has a first image-sided focal length for the first beam component, and a second image-sided focal length for the second beam component, where both image-sided focal lengths satisfy the following equation:

$$2f'_{post\lambda 1}W_p + f'_{post\lambda 1}W_{s1}(W_p; s'_{pre\lambda 1}) = 2f'_{post\lambda 2}W_p + f'_{post\lambda 2}W_{s2}(W_p; s'_{pre\lambda 2}),$$

where $W_{s1}$ is an angle component of the first beam component; and $W_{s2}$ is an angle component of the second beam component, with which the transverse chromatic aberration is corrected for the two beam components.

Additional advantageous embodiments are disclosed in the dependent claims.

BRIEF DESCRIPTION OF THE DRAWINGS

The invention is described below in more detail by means of exemplary embodiments with reference to the drawings.

The drawings show in:

FIG. 3 is a schematic diagram to illustrate characteristics of the scanning device.

FIG. 4a is an exemplary embodiment of a scanning device with an optical modulator for pivoting the light beam.

FIG. 4b is an exemplary embodiment of a scanning device with a fully illuminated pre-scanning optical system; and FIG. 5 is a schematic diagram to illustrate the angle components for the two beam components.

DETAILED DESCRIPTION OF THE DRAWINGS

Figure 1:
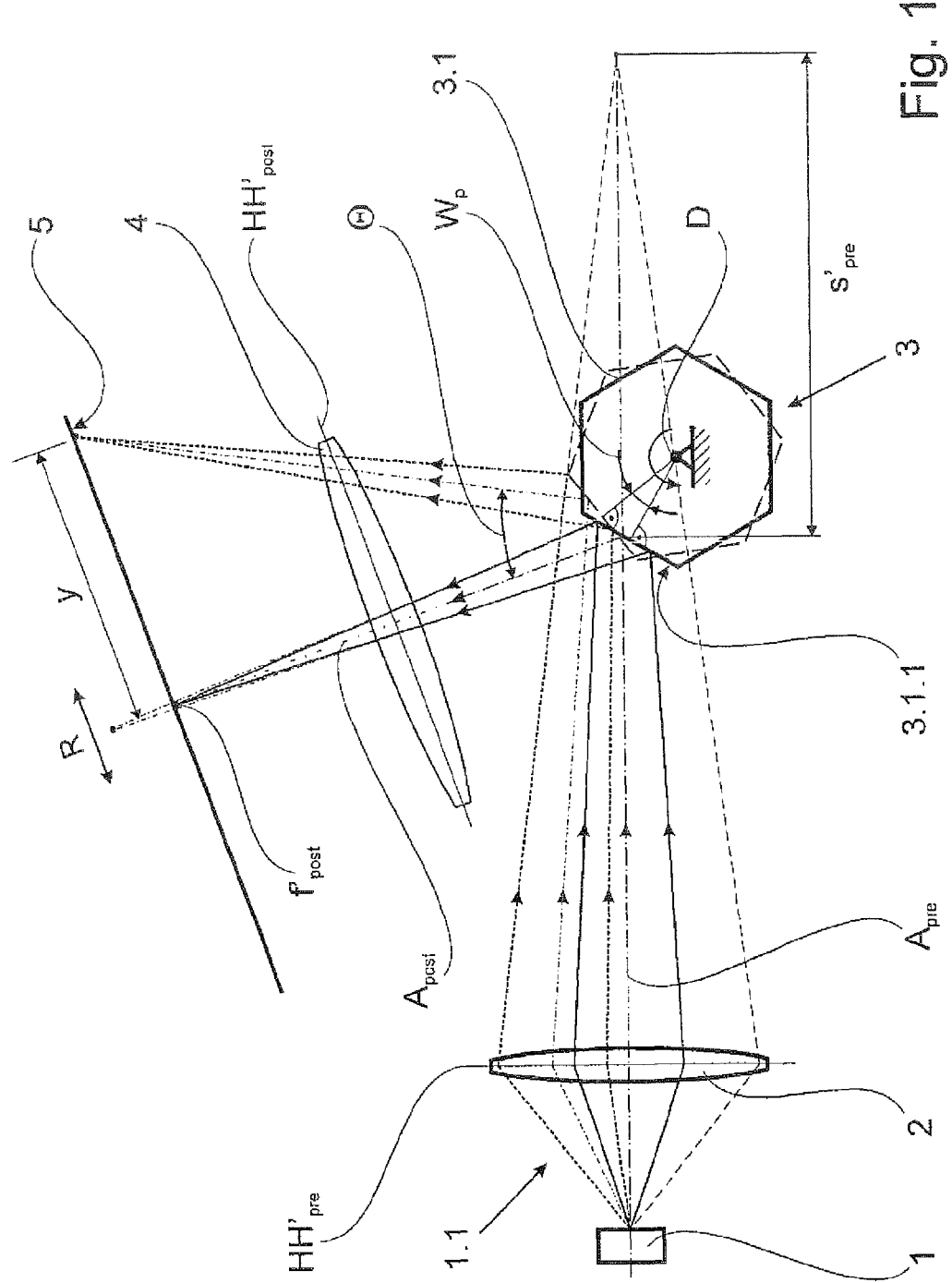
FIG. 1 is an optical schematic diagram of a scanning device for coupling a light beam into the scan direction with two positions of the polygon mirror, for a beam component.

An achromatic scanning device according to the invention includes, according to all of the exemplary embodiments, as shown, for example, in FIG. 1, a light source 1; as well as in its direction of emission, downstream, a pre-scanning optical system 2, a seaming unit 3 having a rotatable polygon mirror 3.1 and a post-scanning optical system 4, formed by an f-theta lens.

When coupling a light beam 1.1, emitted from the light source 1, into the scan direction R, as shown in FIG. 1, the optical axes of the pre-scanning optical system $A_{pre}$ and the post-scanning optical system $A_{post}$ are arranged in a plane (the plane of the drawing) with the scan direction R. The axis of rotation D of the polygon mirror 3.1 is perpendicular to this plane.

Figure 2:
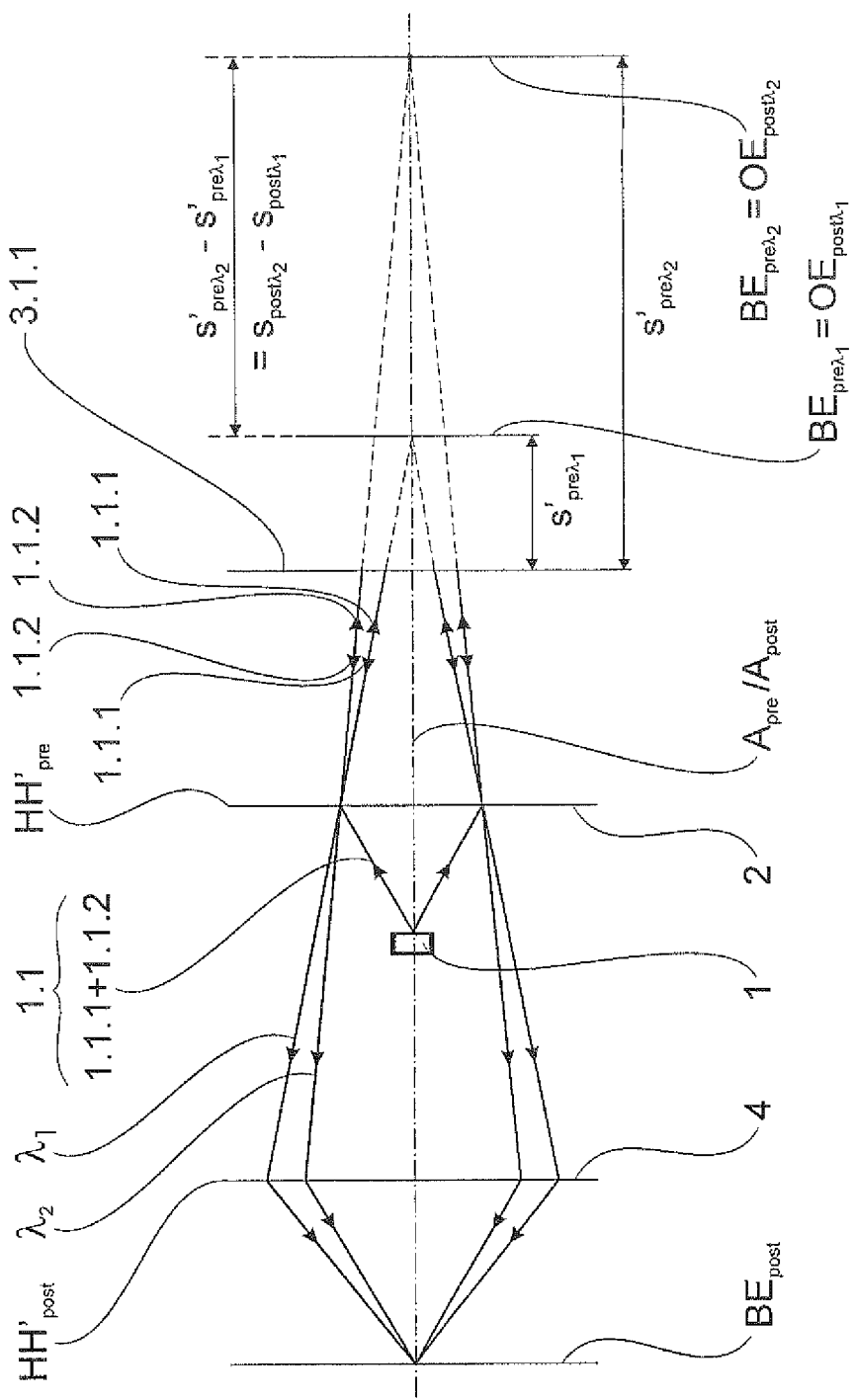
FIG. 2 is an optical schematic diagram of a scanning device for coupling a light beam into the cross scan direction with one position of the polygon mirror, for two beam components.

When coupling the light beam 1.1 into the cross scan direction, as shown in FIG. 2, the optical axes of the pre-scanning optical system $A_{pre}$ and the post-scanning optical system $A_{post}$ are located one above the other, together with the axis of rotation D of the polygon mirror 3.1 in a plane, perpendicular to the plane of the drawing.

These two variants of the coupling-in of the light beam 1.1 are known from the prior art. The position of a reflecting polygon mirror 3.1 is called the zero position, when the light beam 1.1, coming from the light source 1 from a point on the optical axis of the pre-scanning optical system 2, is imaged on a point on the optical axis of the post-scanning optical system 4. The deflection of the reflecting polygon mirror 3.1 about this zero position, i.e. the angular position of the polygon, is indicated by the polygon angle $W_p$, which denotes the angle between the surface normal in the zero position and the surface normal of the reflecting polygon mirror surface 3.1.1, which is deflected relative to the zero position.

At variance with the prior art, the achromatism of the scanning device is not achieved by designing the pre-scanning optical system 2 and the post-scanning optical system 4 so as to be achromatic.

A suitable light source 1 may be any light source that emits, as explained in the introduction, a light beam 1.1 with a first beam component 1.1.1 of a first wavelength $\lambda_1$ and a second beam component 1.1.2 of a second wavelength $\lambda_2$, for which the optical system of the scanning device is achromatized. In particular, when the light source 1 emits UV light with a high power greater than 5 W, the scanning device is advantageous because, compared to optical systems, which usually have to be made achromatic, the savings effect in this embodiment is extremely high, because the optical systems are designed so as to be only monochromatic.

In contrast to the prior art, in which a light beam 1.1, emitted from a light source, is collimated by means of an achromatic pre-scanning optical system 2 and is directed as a parallel light beam 1.1 onto the scanning unit 3, the light beam 1.1 is shaped with a pre-scanning optical system 2, which is specifically adapted to the properties of the monochromatic post-scanning optical system 4, into a slightly divergent or convergent light beam 1.1 and, in particular, in such a way that the intersection length difference of the pre-scanning optical system 2 for the resulting image planes of the two beam components 1.1.1, 1.1.2 is the same size, with the opposite sign, as the intersection length difference of the post-scanning optical system 4 would be, if the image of the light beam 1.1, coming from an object plane, had been formed by means of the post-scanning optical system 4.

As shown in FIG. 2, the first beam component 1.1.1 with the first wavelength $\lambda_1$ is virtually imaged in a first image plane $BE_{pre\lambda1}$ with a first intersection length on the image side $S'_{pre\lambda1}$; and the second beam component 1.1.2 with the second wavelength $\lambda_2$ is virtually imaged in a second image plane $BE_{pre\lambda2}$ with a second intersection length on the image side $S'_{pre\lambda2}$. In this case the image-sided intersection lengths of the pre-scanning optical system 2 are defined in each instance as the distances between the image planes $BE_{pre\lambda1}$, $BE_{pre\lambda2}$ and the reflecting polygon mirror surface 3.1.1 located in zero position.

The pre-scanning optical system 2 is calculated in such a way that the difference between the two image-sided intersection lengths $s'_{pre\lambda2}$-$s'_{pre\lambda1}$ (intersection length difference) corresponds in terms of the amount and with the opposite sign to the difference of the object-sided intersection lengths $s_{pos\lambda2}$-$s_{pos\lambda1}$ for an image formation of the light beam 1.1 by means of the post-scanning optical system 4 in its image plane $BE_{post}$, so that the first image plane $BE_{pre\lambda1}$ coincides with a first object plane of the post-scanning optical system $OE_{post\lambda1}$ for the first wavelength $\lambda_1$; and the second image plane $BE_{pre\lambda2}$ coincides with a second object plane c of the post-scanning optical system $OE_{post\lambda2}$ for the second wavelength $\lambda_2$. In this respect the first and second object plane of the post-scanning optical system $OE_{post\lambda1}$, $OE_{post\lambda2}$ is assigned a common image plane $BE_{post}$, so that the light beam 1.1 with two beam components 1.1.1, 1.1.2 is imaged in the axial direction in a same image position onto a target surface 5, which is arranged here. Such an approach is equivalent to a mutual cancellation of the longitudinal chromatic aberration of the pre-scanning optical system 2 and the post-scanning optical system 4.

In this case, the object-sided intersection lengths of the post-scanning optical system 4 are defined in each instance as the distances between the object planes $OE_{post\lambda1}$, $OE_{post\lambda2}$ and the reflecting polygon mirror surface 3.1.1 located in zero position.

In order to prevent the post-scanning optical system 4 from shading the light beam 1.1 when coupling into the cross scan direction, the two optical axes $A_{pre}$ and $A_{post}$ enclose together a sufficiently large angle, for which reason the axis of rotation D of the polygon mirror 3.1 is arranged in such a way that it is suitably tilted relative to these two optical axes $A_{pre}$ and $A_{post}$.

For the same purpose, when coupling into the scan direction, the axis of rotation D is arranged at a sufficiently large vertical distance from the optical axis of the pre-scanning optical system $A_{pre}$.

The transverse chromatic aberration of the post-scanning optical system 4, which is produced by the f-theta lens and which increases with the increasing coupling-in angle θ of the light beam 1.1 in the post-scanning optical system 4, is also cancelled for an inventive scanning device with the color-dependent and polygon angle-dependent coupling-in angle of the pre-scanning optical system 2, which is adjusted by the degree of convergence/divergence of the light beam 1.1, expressed by the image-sided intersection length of the pre-scanning optical system 2.

For this purpose, the two appropriate image-sided focal lengths $f_{post\lambda1}$, $f_{post\lambda2}$ of the post-scanning optical system 4 were calculated, as described in more detail below, with the help of the two image-sided intersection lengths of the pre-scanning optical system $s'_{pre\lambda1}$, $s'_{pre\lambda2}$ and the polygon angle $W_p$ and with the assumption that both beam components 1.1.1, 1.1.2 are imaged at an identical image height $y_1=y_2$ onto the target surface 5. A post-scanning optical system 4 with these calculated image-sided focal lengths $f_{post\lambda1}$, $f_{post\lambda2}$ has a transverse chromatic aberration, which cancels the transverse chromatic aberration, which is produced by the imaging of the beam components 1.1.1, 1.1.2 by means of the pre-scanning optical system 2 and the scanning unit 3.

FIG. 5 shows the formation of the angle components $W_{s1}$ and $W_{s2}$ that vary in size and that are enclosed in each case by the axial ray of a beam component 1.1.1, 1.1.2 and the optical axis of the pre-scanning optical system $A_{pre}$.

Upon elimination of the transverse chromatic aberration, the image of two beam components 1.1.1 and 1.1.2 is formed not only longitudinally, but also transversely to the optical axis of the post-scanning optical system $A_{post}$ and, as a result, completely, i.e. when viewed not only longitudinally but also transversely, in the same image position.

The image-sided aperture angle $\omega'_{pre}$ of the pre-scanning optical system 2 is selected in such a way that the reflecting surface 3.1.1 of the polygon mirror is illuminated in the scanning direction R in each angular position of the polygon by means of a geometrically defined component of a light beam 1.1. which can be imaged by means of the aperture stop $AP_{pre}$ of the pre-scanning optical system 2. In each angular position of the polygon only the reflecting polygon mirror surface 3.1.1 that reflects onto the target surface should be construed as the reflecting polygon mirror surface 3.1.1.

Then the light beam 1.1 may be either a broad light beam 1.1, which is defined by the aperture stop $AP_{pre}$ and which has a central beam that coincides with the optical axis of the pre-scanning optical system $A_{pre}$ and from which different segments are reflected as a function of the polygon angle $W_p$ (see in this respect FIG. 4a), or it may be configured as a narrow light beam 1.1, which can be modulated in its propagation direction, adjusted to the angular position of the polygon, and, as a result, can be reflected in its entirety (see in this respect FIG. 4b). In this case a light source 1 is professionally designed or selected in such a way that it is capable of providing the light beam 1.1 with the appropriate properties.

According to the embodiment that is shown only for illustrative purposes in FIG. 4a, a light source 1 with a radiation pattern is selected, or more specifically the emitted light beam 1.1 is shaped or rather expanded by the pre-scanning optical system 2 in such a way that the aperture stop of the pre-scanning optical system $AP_{pre}$ is illuminated in its entirety by the light beam 1.1. Then another segment of the light beam 1.1, which is geometrically defined by the reflecting polygon mirror surface 3.1.1, impinges on the reflecting polygon mirror surface 3.1.1 in different angular positions of the polygon mirror 3.1 and is reflected to the post-scanning optical system 4.

According to the embodiment that is shown only for illustrative purposes in FIG. 4b, an acousto-optical modulator 6, which affects the light beam 1.1 in its direction of propagation, is arranged upstream of the pre-scanning optical system 2. A light source 1 with a radiation pattern is used that produces a light beam 1.1 that imaged by means of the pre-scanning optical system 2 forms a beam cross-section, preferably less than or equal to the polygon mirror surface 3.1.1, on the reflecting surface 3.1.1 of the polygon mirror, so that said light beam is completely reflected.

In order for the central ray of the light beam 1.1 to impinge centrally on the reflecting polygon mirror surface 3.1.1 in each angular position of the polygon, the modulator 6 can be actuated in such a way that its angular velocity, at which it pivots the light beam 1.1 about the optical axis of the pre-scanning optical system $A_{pre}$, is adjusted to the rotational speed of the polygon mirror 3.1 and, as a result, to the scan speed.

Although the first described embodiment of a scanning device does not need an acousto-optical modulator 6, it is inefficient in terms of energy, because only a portion of the radiant energy of the light beam 1.1 is directed onto the target surface 5 and can, therefore, be used. Moreover, in the case of the second embodiment the radiant energy of the light beam 1.1, impinging on the reflecting polygon mirror 3.1, and, thus, its illumination is constant with a Gaussian intensity distribution within the light beam 1.1.

In both exemplary embodiments of a scanning device, the coupling-in angle θ of the light beam 1.1 into the post-scanning optical system 4 is determined not just by the polygon angle $W_p$ alone, where theta would be equal to $2 W_p [θ=2 W_p]$, but rather, an intersection length-dependent and polygon angle-dependent angle component $W_s$ is added.

Therefore, the coupling-in angle θ for the beam component with λ1 is calculated according to: θλ1=2 Wp−Ws1 (Wp; s'preλ1) and for the beam component with λ2 is calculated according to: θλ2=2 Wp−Ws2 (Wp; s'preλ2).

For the image height y, i.e. the distance of the image of the light beam 1.1 formed on the target surface 5 from the optical axis of the post-scanning optical system Apost (image position perpendicular to the optical axis Apost), it holds after the post-scanning optical system 4, formed by an f-theta lens, with a first image-sided focal length f'postλ1, for the first beam component 1.1.1 with λ1: yλ1=2 f'postλ1 Wp+f'postλ1 Ws1 (Wp; s'postλ1) and with a second image-sided focal length f'postλ2, for the second beam component 1.1.2 with λ2: yλ2=2 f'postλ2 Wp+f'postλ2 Ws2 (Wp; s'postλ2)

where:

$$\tan(W_{s1}) \approx Sw/2 * \sin(W_p)/s'_{pre\lambda1} \text{ and}$$

$$\tan(W_{s2}) \approx Sw/2 * \sin(W_p)/s'_{pre\lambda2}.$$

The characteristics that have not been introduced yet in the description are apparent from FIG. 5 and FIG. 3. For the sake of clarity in FIG. 3, these characteristics were not shown (neither are they shown in FIGS. 1, 4a and 4b) differentiated as a function of the wavelengths.

Based on the knowledge of the above equations, it is possible at this point to calculate an optical system, in which $f'_{post\lambda1}$, $s'_{pre\lambda1}$, $f'_{post\lambda2}$ and $s'_{pre\lambda2}$ are determined in such a way that $y_{\lambda1}$ is equal to $y_{\lambda2}$.

This property leads to a compensation of the transverse chromatic aberration of the pre-scanning optical system 4.

The calculation of the pre-scanning optical system 2 and the post-scanning optical system 4 in detail and their arrangement with respect to each other, so that the aforementioned conditions are met, is performed by a computer. For this purpose the lens designer enters, based on the aforementioned conditions, the corresponding suitable starting parameters.

For many applications a telecentric design of the post-scanning optical system 4 is less expensive or even mandatory.

In this case, it is advantageous for large image fields that the f-theta lens has, instead of the telecentrics generating field lens, a field mirror, which introduces a significant portion of the refractive power to be provided by the f-theta lens. However, the field mirror does not cause by itself chromatic aberrations, so that the chromatic aberration of the f-theta lens can be minimized.

Typically, the specialist for a generic scanning device will calculate an anamorphic optical system, so that the above conditions apply only in one plane of an elongated optical system, spanned by the optical axis A and the scan direction R. Then in the direction perpendicular to the scan direction, the cross scan direction, the first image plane and the second image plane do not coincide with the first image plane $BE_{pre\lambda1}$ and the second image plane $BE_{pre\lambda2}$ in the scan direction; instead, they are advantageously present on or near the reflecting polygon mirror surface 3.1.1, so that a so-called wobble compensation is achieved.

The anamorphic embodiment of a scanning device according to the invention is not the subject matter of the invention, but rather the properties of the scanning device that act in the scan direction and, thus, the features that cause these properties are the subject matter of the present invention.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

LIST OF REFERENCE NUMERALS AND SYMBOLS

1 light source
1.1 light beam
1.1.1 first beam component
1.1.2 second beam component
2 pre-scanning optical system, also represented by and denoted as $HH'_{pre}$
3 scanning unit
3.1 polygon mirror
3.1.1 reflecting polygon mirror surface
4 post-scanning optical system, also represented by and denoted as $HH'_{post}$
5 target surface
6 acousto-optical modulator
R scan direction
$A_{pre}$ optical axis of the pre-scanning optical system
$A_{post}$ optical axis of the post-scanning optical system
$\lambda_1$ first wavelength, equal to the wavelength of the first beam component
$\lambda_2$ second wavelength, equal to the wavelength of the second beam component
$BE_{pre\lambda1}$ first image plane of the pre-scanning optical system
$s'_{pre\lambda1}$ first image-sided intersection length of the pre-scanning optical system
$BE_{pre\lambda2}$ second image plane of the pre-scanning optical system $s'_{pre\lambda 2}$ second image-sided intersection length of the pre-scanning optical system $s_{post\lambda 1}$ first object-sided intersection length of the post-scanning optical system $s_{post\lambda 2}$ second object-sided intersection length of the post-scanning optical system $OE_{post\lambda 1}$ first object plane of the post-scanning optical system $OE_{post\lambda 2}$ second object plane of the post-scanning optical system $BE_{post}$ image plane of the post-scanning optical system $AP_{pre}$ aperture stop of the pre-scanning optical system $\omega'_{pre}$ image-sided aperture angle of the pre-scanning optical system $W_p$ polygon angle $W_{s1}$ angle component of the first beam component $W_{s2}$ angle component of the second beam component $S_w$ key width of the polygon mirror $\theta_{\lambda 1}$ coupling-in angle in the post-scanning optical system for the first wavelength $\theta_{\lambda 2}$ coupling-in angle in the post-scanning optical system for the second wavelength $f_{post\lambda 1}$ first image-sided focal length of the post-scanning optical system for the first beam component $f_{post\lambda 2}$ second image-sided focal length of the post-scanning optical system for the second beam component y image height y1 image height for the first beam component y2 image height for the second beam component D axis of rotation

What is claimed is:

1. Achromatic scanning device comprising a light source a scanning unit formed with a rotatable polygon mirror, having a polygon angle; a pre-scanning optical system upstream of the polygon mirror, for shaping and guiding a light beam which is emitted from the light source onto the polygon mirror, wherein the light beam has a first beam component having a first wavelength and a second beam component having a second wavelength as well as a post-scanning optical system, said post scanning optical system being downstream of the polygon mirror and being formed by an f-theta lens for shaping and guiding the light beam deflected by the polygon mirror into a scan direction onto a target surface which is arranged in an image plane of the post-scanning optical system for the two beam components, wherein the post-scanning optical system is monochromatic, so that an imaging in an ideal image position occurs only for a light beam with one wavelength, said pre-scanning optical system and said post-scanning optical system being designed and arranged with respect to each other in such a way that for a light beam, which is imaged onto the target surface, a first image plane of the pre-scanning optical system in a first image-sided intersection length coincides with a first object plane of the post-scanning optical system for the first beam component; and a second image plane of the pre-scanning optical system in a second image-sided intersection length coincides with a second object plane of the post-scanning optical system for the second beam component, wherein the first object plane of the post-scanning optical system and the second object plane of the post-scanning optical system are assigned the image plane of the post-scanning optical system, so that the longitudinal chromatic aberration is corrected for the two beam components, and wherein for the first beam component the post-scanning optical system has a first image-sided focal length, and a second image-sided focal length for the second beam component, where both image-sided focal lengths satisfy the following equation:

$$2f_{post\lambda 1}W_p + f_{post\lambda 1}W_{s1}(W_p;s'_{pre\lambda 1}) = 2f_{post\lambda 2}W_p + f_{post\lambda 2}W_{s2}(W_p;s'_{pre\lambda 2}),$$

where $W_{s1}$ is an angle component of the first beam component; and $W_{s2}$ is an angle component of the second beam component, and $\tan(W_{s1}) \approx Sw/2 * \sin(W_p)/s'_{pre\lambda 1}$ and $\tan(W_{s2}) \approx Sw/2 * \sin(W_p)/s'_{pre\lambda 2}$, where Sw is the key width of the polygon mirror, with which the transverse chromatic aberration is also corrected for the two beam components.

2. Achromatic scanning device, as claimed in claim 1, wherein upstream of the pre-scanning optical system there is an acousto-optical modulator, which can be actuated in such a way that it pivots the light beam about an optical axis of the pre-scanning optical system, at the same angular velocity, at which the polygon mirror rotates, so that a central ray of the light beam is always directed onto the center point of a reflecting polygon mirror surface of the polygon mirror.

3. Achromatic scanning device, as claimed in claim 2, wherein the light source and the modulator are designed in such a way that the light beam is completely reflected.

4. Achromatic scanning device, as claimed in claim 1, wherein an image-sided aperture angle of the pre-scanning optical system is selected in such a way that when the light beam fully illuminates an aperture stop of the pre-scanning optical system, said light beam is reflected in segments from the reflecting polygon mirror surface in each angular position of the polygon mirror.

5. Achromatic scanning device, as claimed in claim 1, wherein the f-theta lens is a telecentric lens.

6. Achromatic scanning device, as claimed in claim 5, wherein the f-theta lens has a cylindrical mirror having a cylindrical axis that is directed perpendicular to the scan direction, so that a portion of the refractive power of the f-theta lens is provided independently of the wavelength.

* * * * *